United States Patent
Huang et al.

(10) Patent No.: US 11,249,315 B2
(45) Date of Patent: Feb. 15, 2022

(54) AUGMENTED REALITY SYSTEM AND METHOD OF DISPLAYING VIRTUAL SCREEN USING AUGMENTED REALITY GLASSES

(71) Applicant: Acer Incorporated, New Taipei (TW)

(72) Inventors: Yung-Cheng Huang, New Taipei (TW); Shu-Kuo Kao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/023,975

(22) Filed: Sep. 17, 2020

(65) Prior Publication Data

US 2021/0318541 A1 Oct. 14, 2021

(30) Foreign Application Priority Data

Apr. 13, 2020 (TW) .................................. 109112313

(51) Int. Cl.
*G02B 27/01* (2006.01)
*G06K 9/00* (2022.01)
*G06T 19/00* (2011.01)

(52) U.S. Cl.
CPC ..... *G02B 27/0172* (2013.01); *G06K 9/00335* (2013.01); *G06T 19/006* (2013.01); *G02B 2027/0178* (2013.01)

(58) Field of Classification Search
CPC .......... G02B 27/017; G02B 2027/0134; G02B 2027/014; G02B 2027/0178; G06F 3/011;
(Continued)

(56) References Cited

U.S. PATENT DOCUMENTS 9,726,896 B2 8/2017 Von und Zu Liechtenstein
2014/0256429 A1* 9/2014 Kobayashi .............. A63F 13/25
463/31

(Continued)

FOREIGN PATENT DOCUMENTS

TW 201827888 A 8/2018
TW 201907204 A 2/2019
TW I674562 B 10/2019

OTHER PUBLICATIONS

Chinese language office action dated Nov. 25, 2021, issued in application No. TW 109112313.

*Primary Examiner* — Nelson M Rosario
(74) *Attorney, Agent, or Firm* — McClure, Qualey & Rodack, LLP (57) ABSTRACT

An augmented reality system includes a portable electronic device, a pair of augmented reality glasses, and a processing circuit. The portable electronic device has a display module and a positioning assembly, and the positioning assembly is disposed on the display module. The augmented reality glasses include an image capture module, and the image capture module is configured to capture at least one image of the display module. The processing circuit is configured to determine a position of an image center point of the at least one image relative to the positioning assembly according to the at least one image. When the processing circuit determines that the position of the image center point moves from the display module across the positioning assembly, the processing circuit controls the augmented reality glasses to display a virtual screen, and the virtual screen extends from a first side of the display module.

18 Claims, 10 Drawing Sheets

(58) Field of Classification Search
CPC .... G06F 3/012; G06F 3/04815; G06F 3/0481; G06F 3/0487; G06F 3/1454; G06T 15/503; G06T 19/006
See application file for complete search history.

(56) References Cited

U.S. PATENT DOCUMENTS

| | | |
|---|---|---|
| 2015/0205106 A1* | 7/2015 | Norden ................ G02B 27/017 345/7 |
| 2018/0205932 A1 | 7/2018 | Yu et al. |
| 2019/0164347 A1* | 5/2019 | Floury ................ G06F 3/0481 |
| 2020/0081530 A1 | 3/2020 | Greenberg |

* cited by examiner

AUGMENTED REALITY SYSTEM AND METHOD OF DISPLAYING VIRTUAL SCREEN USING AUGMENTED REALITY GLASSES

CROSS REFERENCE TO RELATED APPLICATIONS

This application claims the benefit of Taiwan Patent Application No. 109112313, filed Apr. 13, 2020, the entirety of which is incorporated by reference herein.

BACKGROUND OF THE DISCLOSURE

Field of the Disclosure

The present disclosure relates to an augmented reality system and method, and particularly to an augmented reality system and method by using augmented reality glasses to display a virtual screen.

Description of the Related Art

As technology has developed, tablet computers, desktop computers and notebook computers have all become very popular products.

Generally speaking, a notebook computer has only a single display screen. However, as the performance of notebook computers has improved, more and more programs can be executed, so a single display screen is no longer sufficient for users. However, a physical expansion screen must be externally attached to the notebook computer, which increases the weight and reduces the mobility of the notebook computer, and also increases the user's expense.

Therefore, how to design a solution that can add an extra display screen without reducing mobility is a topic that needs to be discussed and solved.

BRIEF SUMMARY OF THE DISCLOSURE

Accordingly, one objective of the present disclosure is to provide an augmented reality system to solve the above problems.

According to some embodiments of the disclosure, an augmented reality system includes a portable electronic device, a pair of augmented reality glasses, and a processing circuit. The portable electronic device has a display module and a positioning assembly, and the positioning assembly is disposed on the display module. The augmented reality glasses include an image capture module, and the image capture module is configured to capture at least one image of the display module. The processing circuit is configured to determine a position of an image center point of the at least one image relative to the positioning assembly according to the at least one image. When the processing circuit determines that the position of the image center point moves from the display module across the positioning assembly, the processing circuit controls the augmented reality glasses to display a virtual screen, and the virtual screen extends from a first side of the display modules.

According to some embodiments of the disclosure, a method of displaying a virtual screen using augmented reality glasses, comprising: disposing a positioning assembly on a display module; capturing at least one image of the display module; determining a position of an image center point of the at least one image relative to the positioning assembly according to the at least one image; and controlling the augmented reality glasses to display a virtual screen when the position of the image center point moves from a range of the display module and exceeds the positioning assembly, wherein the virtual screen extends from a side of the display module.

The present disclosure provides an augmented reality system, which includes a portable electronic device, augmented reality glasses, and an expansion device. The user can wear the augmented reality glasses and use the portable electronic device at the same time. A positioning assembly is disposed on the portable electronic device, and the processing circuit can determine the position of the center point of the user's field of view relative to the positioning assembly according to the image provided by the image capturing module on the augmented reality glasses and further controls the optical display module to display the corresponding virtual screen.

Therefore, based on the design of the present disclosure, the user does not need to purchase an extra physical screen to install on the portable electronic device, so that the mobility of the portable electronic device can be maintained, and the purpose of adding an expanding screen can be achieved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying FIG.s. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

Figure 1:
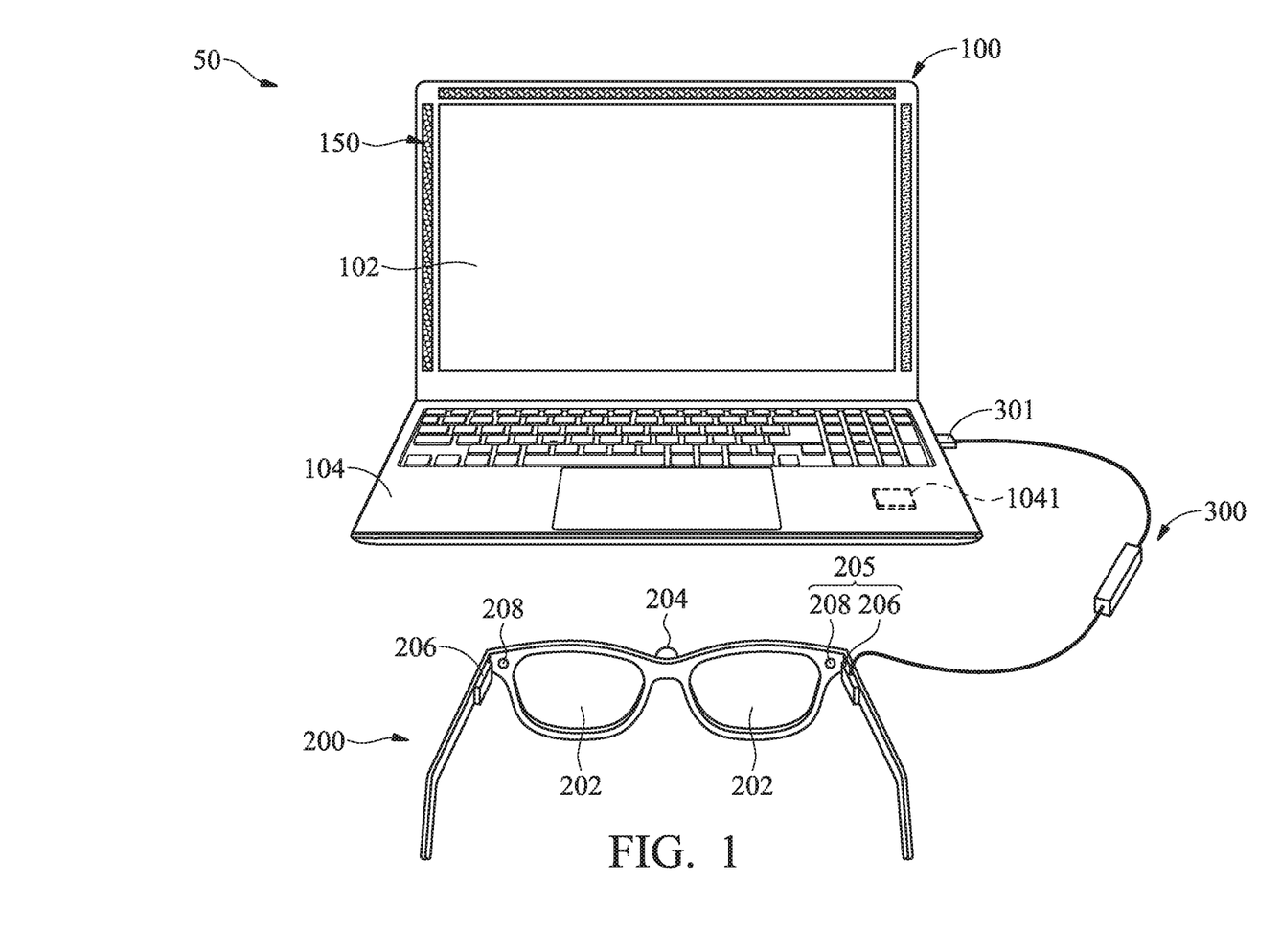
FIG. 1 is a schematic diagram of an augmented reality system 50 according to an embodiment of the present disclosure.

Please refer to FIG. 1, which is a schematic diagram of an augmented reality system 50 according to an embodiment of the present disclosure. The augmented reality system 50 may include a portable electronic device 100, augmented reality glasses 200 and an expansion device 300. The portable electronic device 100 may be a notebook computer, which includes a display module 102 and a host module 104. In this embodiment, the portable electronic device 100 may further include a positioning assembly 150 disposed on the display module 102.

The host module 104 may include a processing circuit 1041, such as a central processing unit (CPU), configured to control the operation of the portable electronic device 100. The central processing unit provides the processing capability required to execute an operating system, programs, user graphic interface (GUI), software, modules, application, and other functions of the portable electronic device 100.

In this embodiment, the augmented reality glasses 200 are electrically connected to the host module 104 through the expansion device 300, and the augmented reality glasses 200 may include two lenses 202, an image capturing module 204, and an optical display module 205. The lens 202 can be a transparent lens, and the image capturing module 204 is configured to continuously capture the image of the display module 102 and transmit image signal to a processing circuit 200C (FIG. 1A).

The optical display module 205 may include two optical projectors 206 and two optical guiding elements 208. In this embodiment, the optical projector 206 may be a micro-projection head configured to receive a projection signal provided by the processing circuit 200C and then send a projection image to the optical guiding element 208. The optical guiding element 208 may be a reflective mirror (or prism) configured to project the aforementioned projection image to the pupil of a user.

It should be noted that the implementation of the optical display module 205 is not limited to this embodiment. For example, in other embodiments of the present disclosure, the lens 202 may be a half mirror, and the optical guiding element 208 projects the aforementioned projection image onto the lens 202.

Figure 1A:
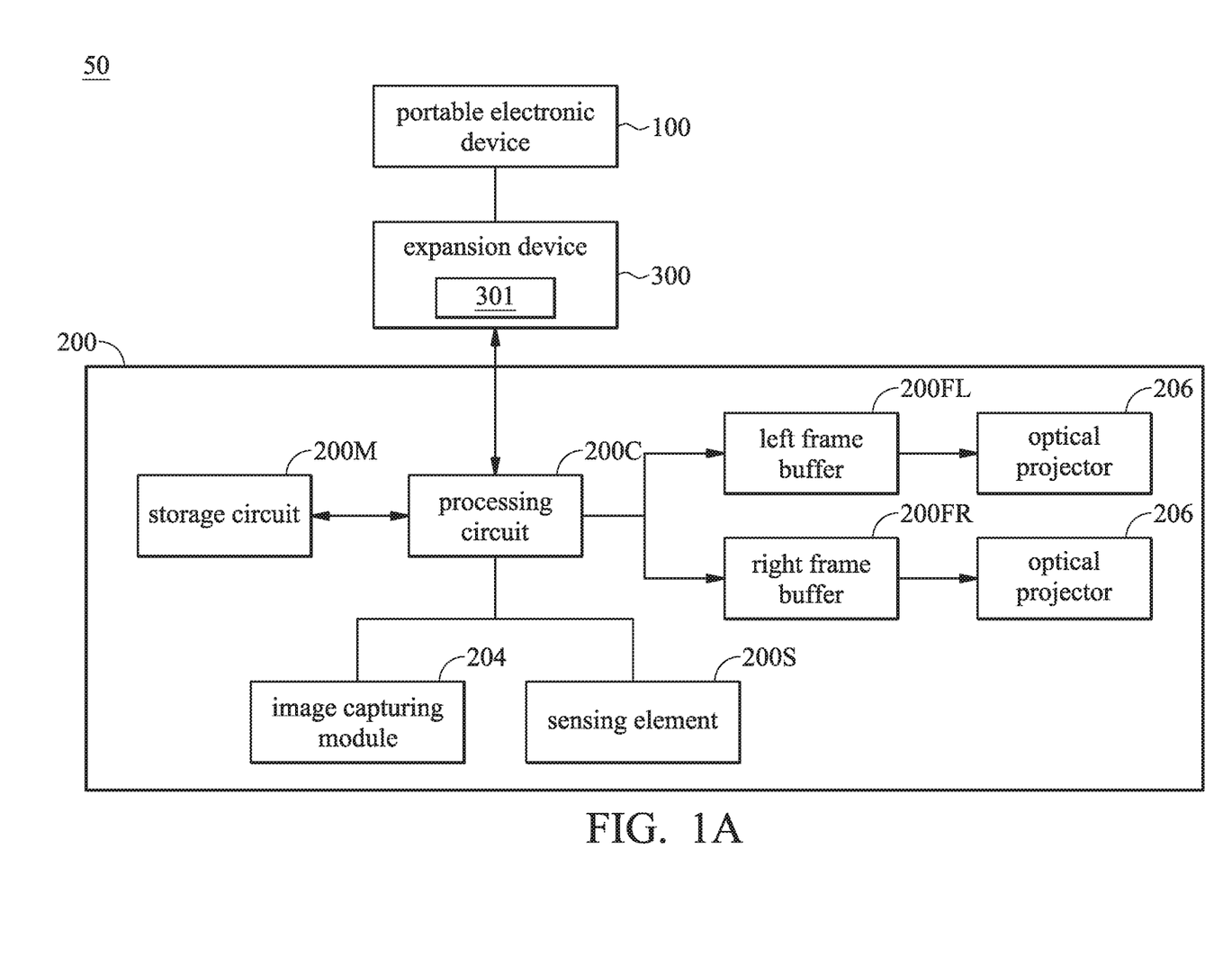
FIG. 1A is a block diagram of the augmented reality system 50 according to an embodiment of the present disclosure.

Please refer to FIG. 1 and FIG. 1A. FIG. 1A is a block diagram of the augmented reality system 50 according to an embodiment of the present disclosure. Specifically, the augmented reality glasses 200 may further include the processing circuit 200C, a storage circuit 200M, a left frame buffer 200FL, and a right frame buffer 200FR. The processing circuit 200C can be a micro-controller unit (MCU). The microcontroller unit can be an integrated chip, and can include a central processor, memory, timer/counter, and an input and output interface integrated therein. The microcontroller unit has the advantages of a simple input and output interface and a small size. The storage circuit 200M may be, for example, a random access memory (RAM), a flash memory, a read-only memory (ROM), and so on. The left frame buffer 200FL and the right frame buffer 200FR are respectively electrically connected to the optical projectors 206 on the left and right sides in FIG. 1. The left frame buffer 200FL and the right frame buffer 200FR are used for temporary storing the image frames provided by the processing circuit 200C and then provide to the optical projectors 206.

The expansion device 300 may include a connection port 301, and the processing circuit 200C may determine the position of a center point of the image relative to the positioning assembly 150 according to the image provided by the image capturing module 204, and transmits the related position data to the host module 104 through the connection port 301 of the expansion device 300. The connection port 301 can be a universal serial bus (USB) port or a display port (DP), but it is not limited thereto. In other embodiments, the augmented reality glasses 200 can also communicate with the host module 104 in a wireless manner (such as WIFI).

In addition, one or more sensing elements 200S, such as motion sensing elements or six degrees of freedom (six degrees of freedom, 6DoF) tracking elements, are disposed on the augmented reality glasses 200 and are electrically connected to the processing circuit 200C, so that the position data calculated by the processing circuit 200C can be more accurate. In addition, in other embodiments, the processing circuit 200C may also be integrated in the processing circuit 1041.

Figure 2:
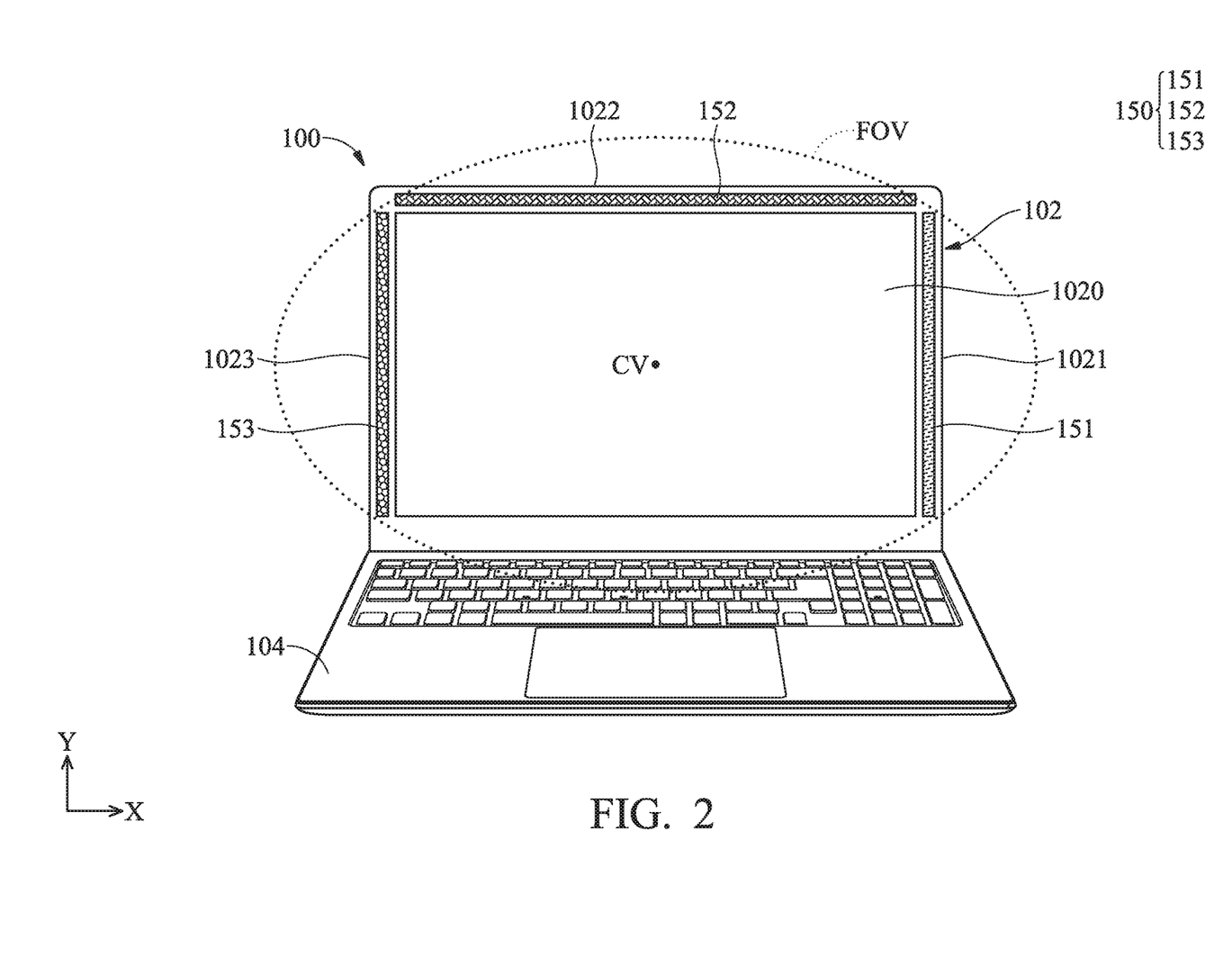
FIG. 2 is an image of the portable electronic device 100 captured by the image capturing module 204 of the augmented reality glasses 200 according to an embodiment of the present disclosure.

Please refer to FIG. 1 and FIG. 2. FIG. 2 is an image of the portable electronic device 100 captured by the image capturing module 204 of the augmented reality glasses 200 according to an embodiment of the present disclosure. The field of view FOV represents the field of view of the user when the user wears the augmented reality glasses 200, and the center point CV is the center point of the user's field of view. The size of the field of view FOV is not limited to that illustrated in the FIG. 2. It is worth noting that, as shown in FIG. 1, the image capturing module 204 of the present disclosure is disposed at the center position between the two lenses 202, so that the center point of the image captured by the image capturing module 204 overlaps the center point CV.

Furthermore, as shown in FIG. 2, in this embodiment, the display module 102 has a first side 1021, a second side 1022, and a third side 1023, and the positioning assembly 150 includes three positioning elements 151, 152 and 153. The positioning elements 151, 152, and 153 each has a strip structure, and the positioning elements 151, 152, and 153 are respectively disposed on the first side 1021, the second side 1022, and the third side 1023. In addition, these positioning elements have different colors. For example, the positioning element 151 may be orange, the positioning element 152 may be green, and the positioning element 153 may be yellow, but they are not limited thereto.

The image capturing module 204 can capture color images of the portable electronic device 100. Therefore, the processing circuit 200C can determine the position (the position data) of the center point of the color image (that is, the center point CV of the user's field of view FOV) relative to the positioning assembly 150 according to the color image captured by the image capturing module 204. As shown in FIG. 2, the center point CV is located within the range of a physical screen 1020 of the display module 102. Then, the processing circuit 200C transmits the position data to the processing circuit 1041 of the host module 104.

Figure 3:
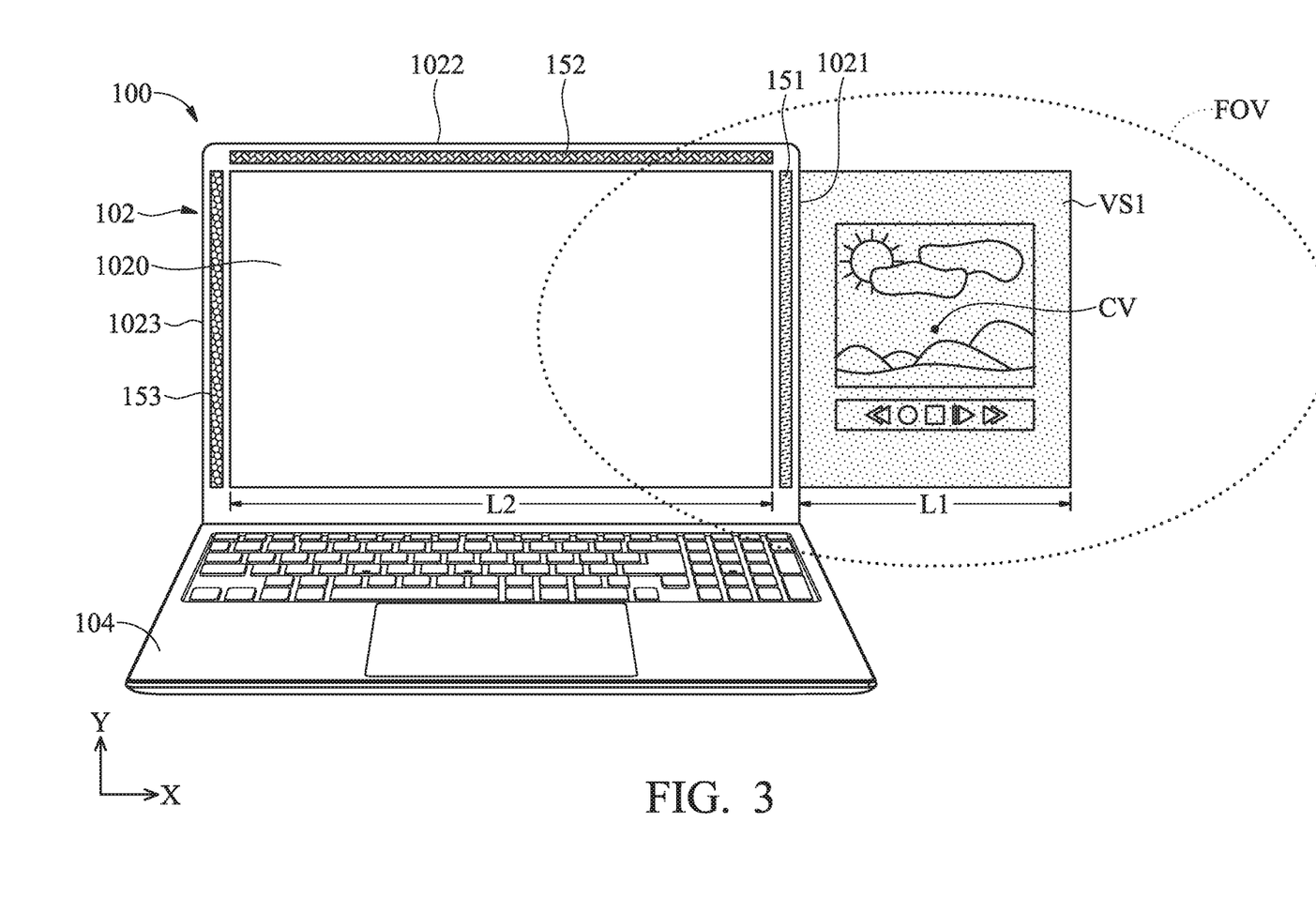
FIG. 3 is another image captured by the image capturing module 204 when the user turns his head to the right according to an embodiment of the present disclosure.

Please refer to FIG. 2 and FIG. 3. FIG. 3 is another image captured by the image capturing module 204 when the user turns his head to the right according to an embodiment of the present disclosure. When the user turns his head to the right, as shown in FIG. 3, the center point CV moves from the position in FIG. 2 to the position in FIG. 3. At this time, the processing circuit 200C determines that the position of the image center point (the center point CV) moves from the display module 102 and exceeds (crosses) the orange positioning element 151 of the positioning assembly 150, and the processing circuit 200C transmits this position data to the processing circuit 1041.

Next, the processing circuit 1041 receives the position data and calculates projection data (including the screen size and position to be projected), and then sends the projection data to the processing circuit 200C. The processing circuit 200C controls the optical projectors 206 and the optical guiding elements 208 to project a first virtual screen VS1 onto the user's retina according to the projection data, as shown in FIG. 3. The first virtual screen VS1 extends from the first side 1021 of the display module 102.

Specifically, as shown in FIG. 3, the first side 1021 and the third side 1023 are disposed along a longitudinal axis (the X-axis) of the display module 102, and the first virtual screen VS1 extends along the longitudinal axis. In this embodiment, the first virtual screen VS1 has a first length L1 in the longitudinal axis, the physical screen 1020 of the display module 102 has a second length L2 in the longitudinal axis, and the first length L1 is less than or equal to one-half of the second length L2, but it is not limited to this. In some embodiments, the second length L2 can also be the length of the display module 102 in the longitudinal axis.

Conversely, when the center point CV moves from the position in FIG. 3 back to the position in FIG. 2, the processing circuit 200C determines that the center point CV moves from the outside of the display module 102 across the positioning element 151 to the inside of the display module 102. Therefore, the processing circuit 1041 and the processing circuit 200C can control the augmented reality glasses 200 to close the first virtual screen VS1.

Figure 4:
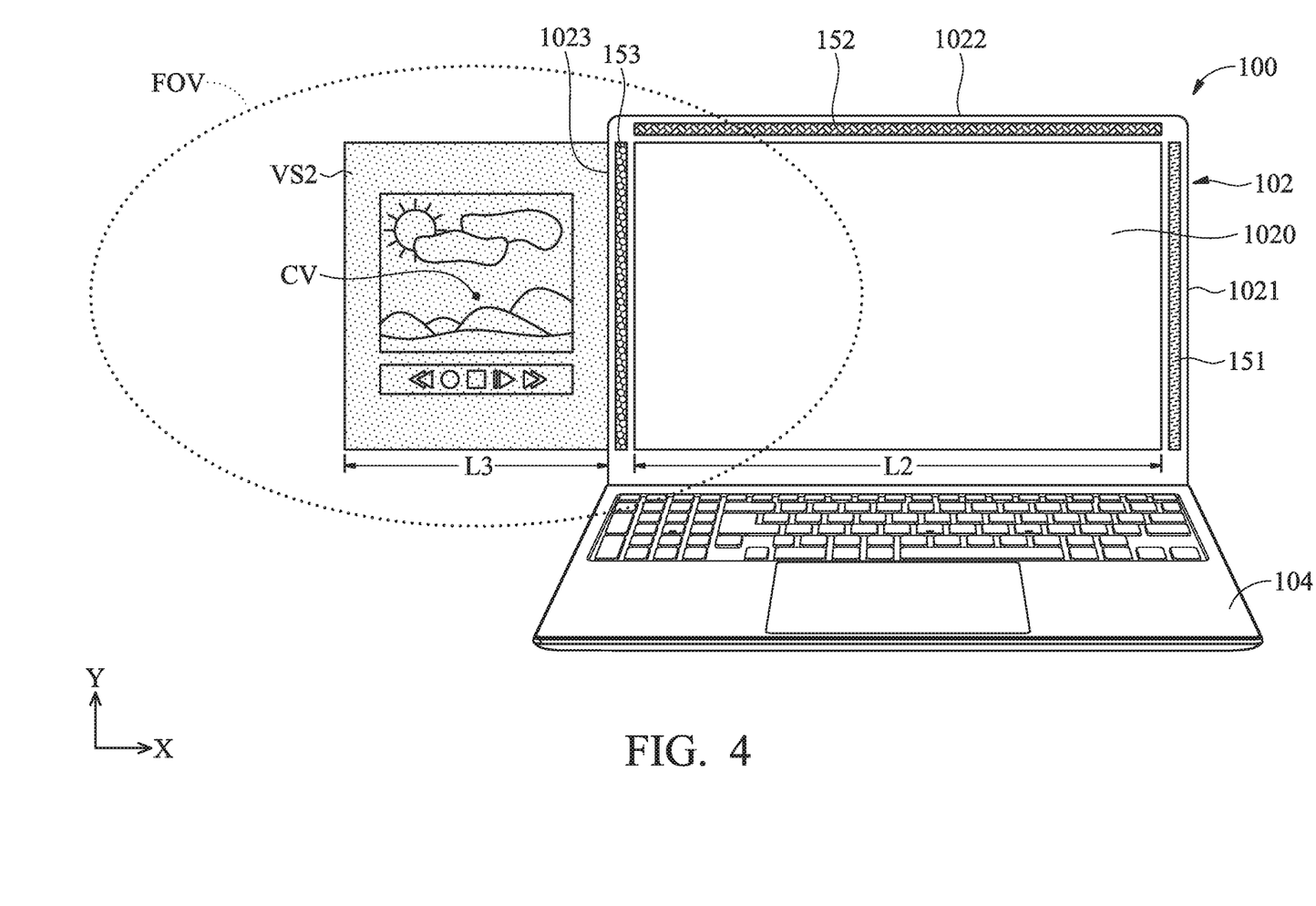
FIG. 4 is another image captured by the image capturing module 204 when the user turns his head to the left according to an embodiment of the present disclosure.

Please refer to FIG. 2 and FIG. 4. FIG. 4 is another image captured by the image capturing module 204 when the user turns his head to the left according to an embodiment of the present disclosure. When the user turns his head to look to the left, the center point CV moves from the position in FIG. 2 to the position in FIG. 4. At this time, the processing circuit 200C determines that the image center point (the center point CV) moves from the display module 102 and exceeds the yellow positioning element 153 of the positioning assembly 150, and the processing circuit 200C transmits this position data to the processing circuit 1041.

Next, the processing circuit 1041 calculates the projection data after receiving the position data and sends the projection data to the processing circuit 200C. The processing circuit 200C controls the optical projectors 206 and the optical guiding elements 208 according to the projection data to project a second virtual screen VS2 onto the user's retina, as shown in FIG. 4. The second virtual screen VS2 extends from the third side 1023 of the display module 102.

As shown in FIG. 4, the second virtual screen VS2 extends along the longitudinal axis, and a third length L3 of the second virtual screen VS2 in the longitudinal axis is also less than or equal to one half of the second length L2.

Figure 5:
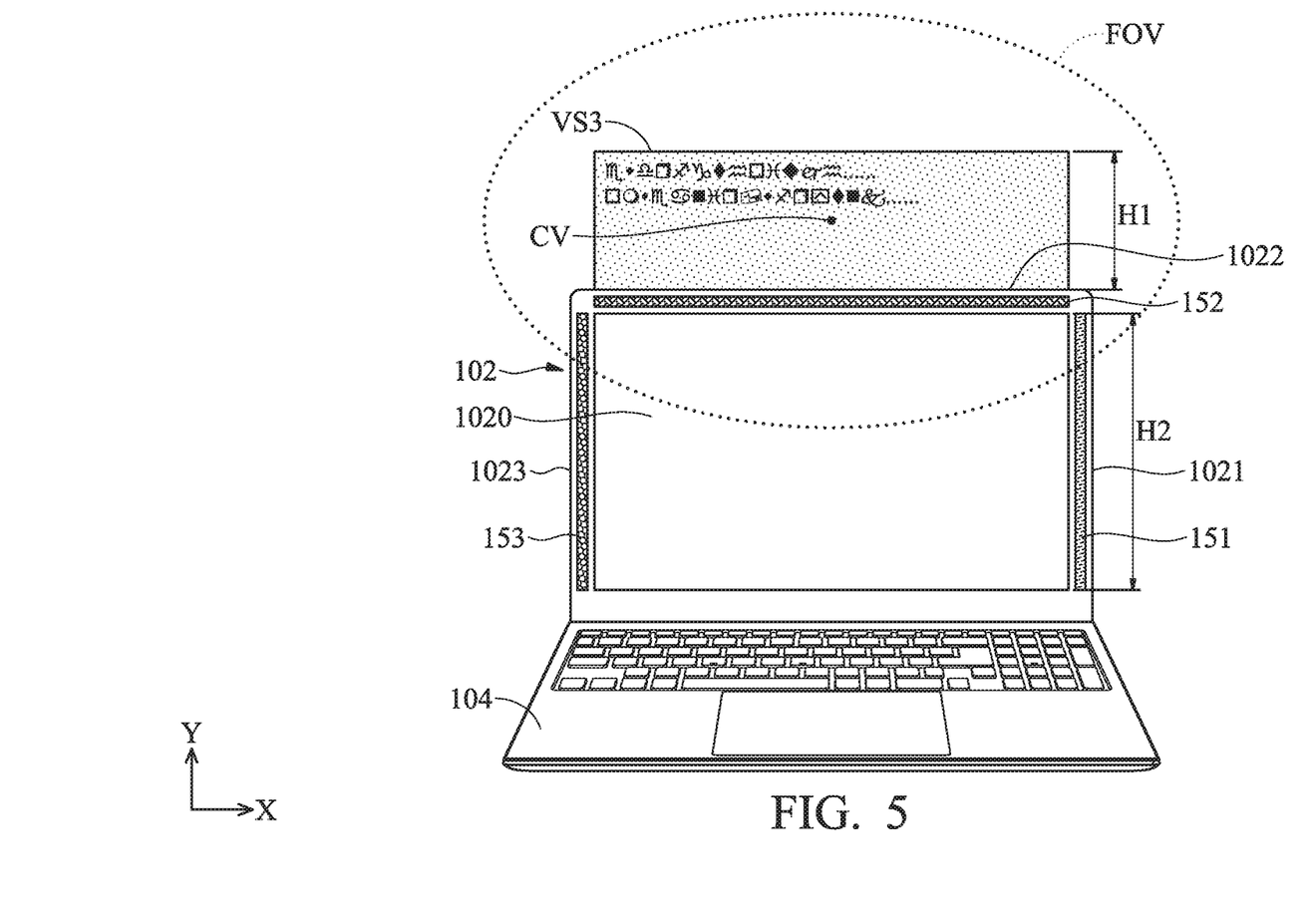
FIG. 5 is another image captured by the image capturing module 204 when the user looks up according to an embodiment of the present disclosure.

Please refer to FIG. 2 and FIG. 5. FIG. 5 is another image captured by the image capturing module 204 when the user looks up according to an embodiment of the present disclosure. When the user looks upwards, the center point CV moves from the position in FIG. 2 to the position in FIG. 5. At this time, the processing circuit 200C determines that the image center point (the center point CV) moves from the display module 102 to exceed the green positioning element 152 of the positioning assembly 150, and the processing circuit 200C transmits this position data to the processing circuit 1041.

Next, the processing circuit 1041 calculates the projection data after receiving the position data and sends the projection data to the processing circuit 200C. The processing circuit 200C controls the optical projectors 206 and the optical guiding elements 208 according to the projection data to project a third virtual screen VS3 onto the user's retina, as shown in FIG. 5. The third virtual screen VS3 extends from the second side 1022.

As shown in FIG. 5, the third virtual screen VS3 has a first height H1 in the Y-axis, the physical screen 1020 of the display module 102 has a second height H2, and the first height H1 is less than or equal to one-half of the second height H2, but it not limited to this. In some embodiments, the second height H2 may also be the height of the display module 102 in the Y-axis.

Figure 6:
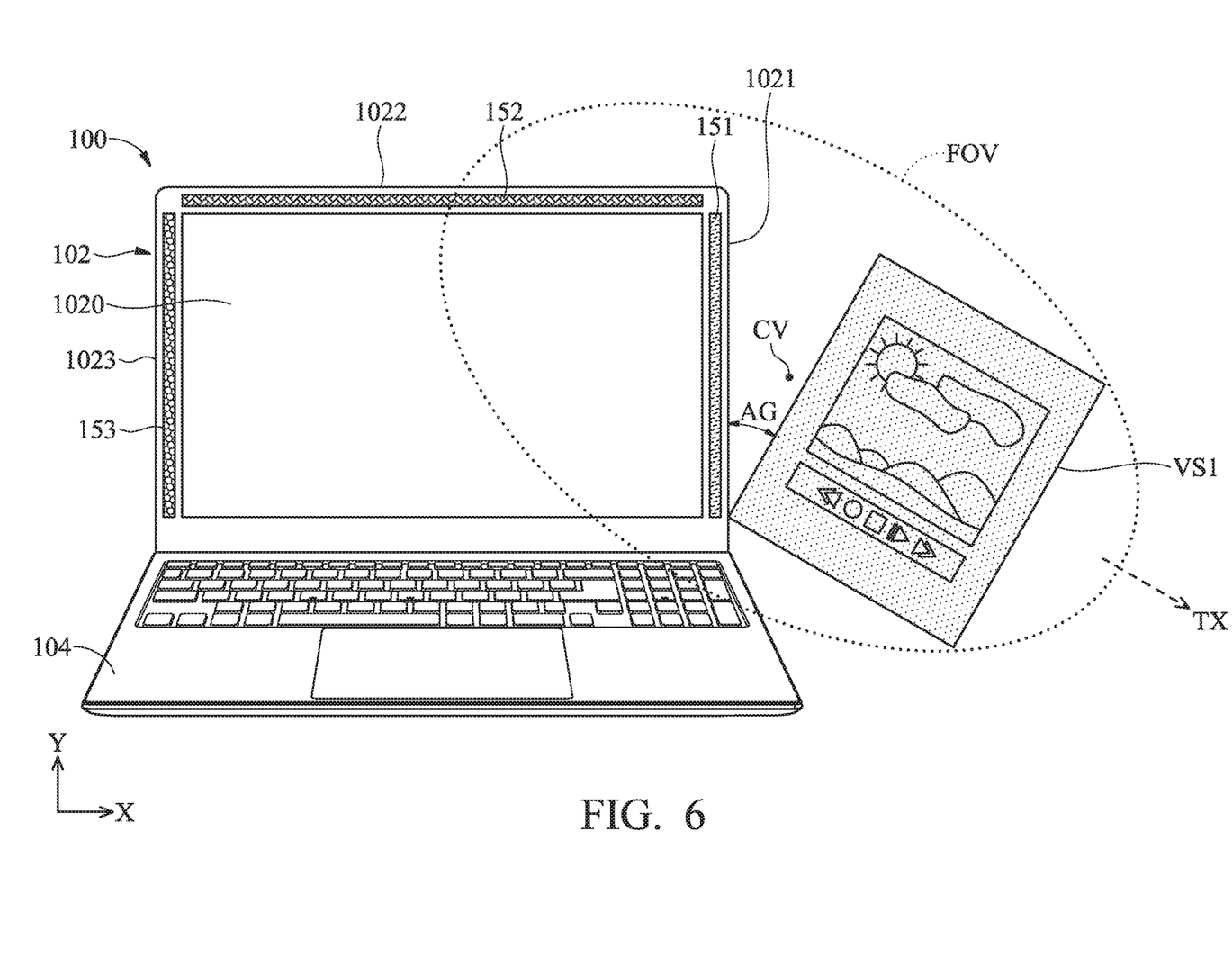
FIG. 6 is another image of the portable electronic device 100 captured by the image capturing module 204 of the augmented reality glasses 200 according to an embodiment of the present disclosure.

Please refer to FIG. 6, which is another image of the portable electronic device 100 captured by the image capturing module 204 of the augmented reality glasses 200 according to an embodiment of the present disclosure. When the user's head tilts, the field of view FOV also tilts. In this embodiment, the augmented reality glasses 200 may define a transverse axis TX, so the image captured by the image capturing module 204 may also have a transverse axis TX. When the center point CV moves across the positioning element 151, the processing circuit 200C controls the first virtual screen VS1 to extend along the transverse axis TX. In this embodiment, an acute angle AG is formed between the first virtual screen VS1 and the first side 1021.

Figure 7:
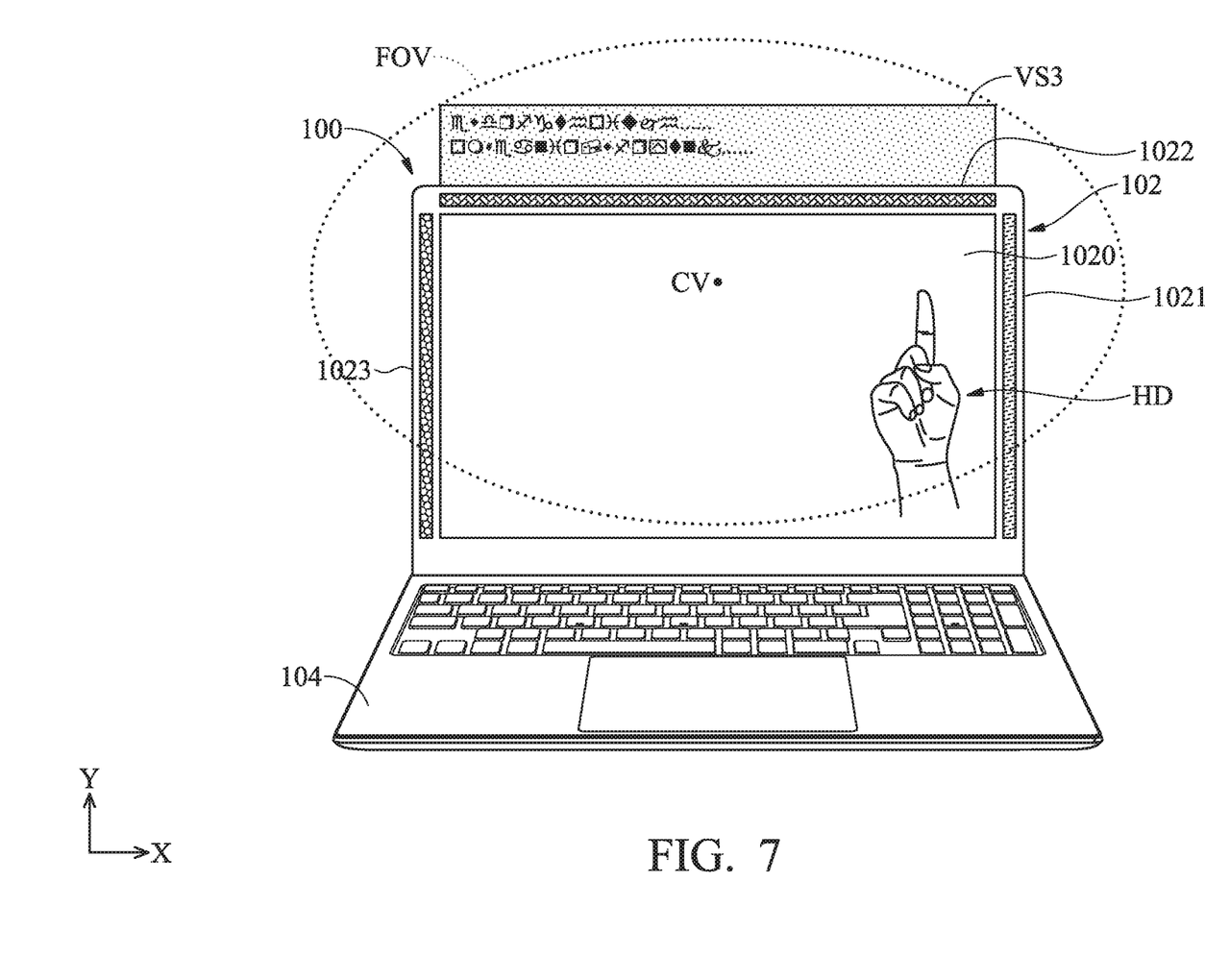
FIG. 7 is another image of the portable electronic device 100 captured by the image capturing module 204 according to an embodiment of the present disclosure.

Please refer to FIG. 7, which is another image of the portable electronic device 100 captured by the image capturing module 204 according to an embodiment of the present disclosure. When the user's hand HD makes a gesture in the field of view FOV, the processing circuit 200C further determines (recognizes) the gesture according to the image. For example, as shown in FIG. 7, the processing circuit 200C determines (recognizes) that the gesture is an upward gesture according to the image, so the processing circuit 200C and the processing circuit 1041 can control the augmented reality glasses 200 to display the third virtual screen VS3 according to the gesture. The other gestures and the actions of the virtual screen are in similar fashions.

It is worth noting that the height of the third virtual screen VS3 in the Y-axis does not exceed the field of view FOV. In addition, in other embodiments, the processing circuit 200C and the processing circuit 1041 can also control the augmented reality glasses 200 to show a virtual screen according to an input signal of a mouse device (not shown in the figures) or an input signal of the keyboard of the host module 104.

Figure 8:
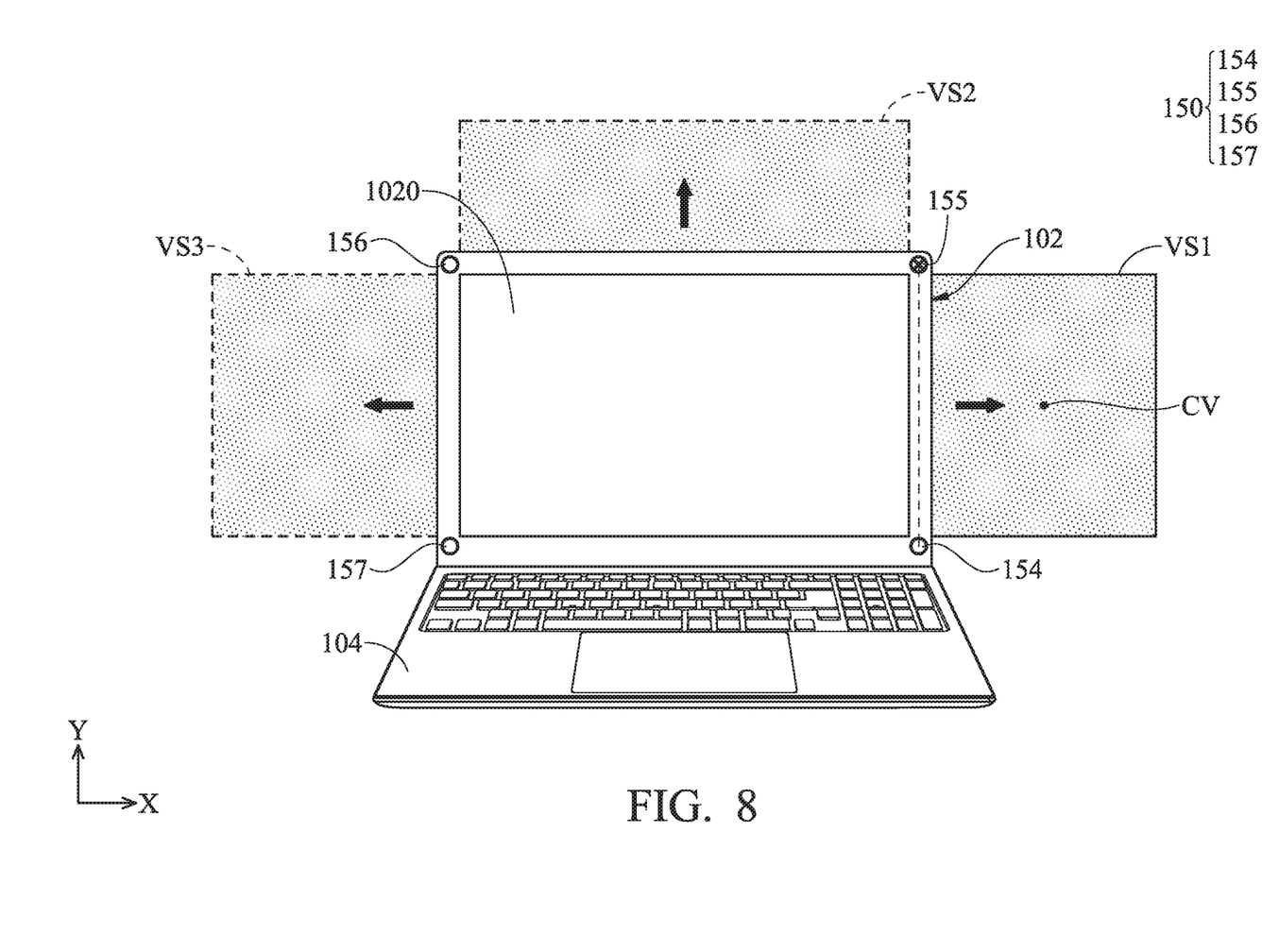
FIG. 8 is a schematic diagram of the display module 102 and the positioning assembly 150 according to another embodiment of the present disclosure.

Please refer to FIG. 8, which is a schematic diagram of the display module 102 and the positioning assembly 150 according to another embodiment of the present disclosure. In this embodiment, the positioning assembly 150 includes four positioning elements 154 to 157, which are respectively disposed at the four corners of the display module 102 and outside the physical screen 1020. The positioning elements 154 to 157 may be dots, and the positioning element 155 has a mark different from the positioning elements 154, 156, and 157, for example, an X-shaped mark. In other embodiments, the positioning element 155 may have a different shape or color from the positioning elements 154, 156, and 157.

Based on the design of the positioning elements 154 to 157, the processing circuit 1041 and the processing circuit 200C can determine whether to display the first virtual screen VS1, the second virtual screen VS2 or the third virtual screen VS3 according to the relative position of the center point CV. For example, when the center point CV moves from the display module 102 and exceeds a connection line of the positioning elements 154 and 155, the first virtual screen VS1 is displayed.

It should be noted that in other embodiments, the positioning elements 154 to 157 may be pixels displayed on the physical screen 1020 and located at the four corners of the physical screen 1020.

In addition, in some embodiments, a camera (not shown in the figures) may be disposed on the display module 102 and is configured to capture images of the user. Therefore, the processing circuit 1041 can compare the image captured by the camera with the image captured by the image capturing module 204 so as to obtain more accurate position data.

Figure 9:
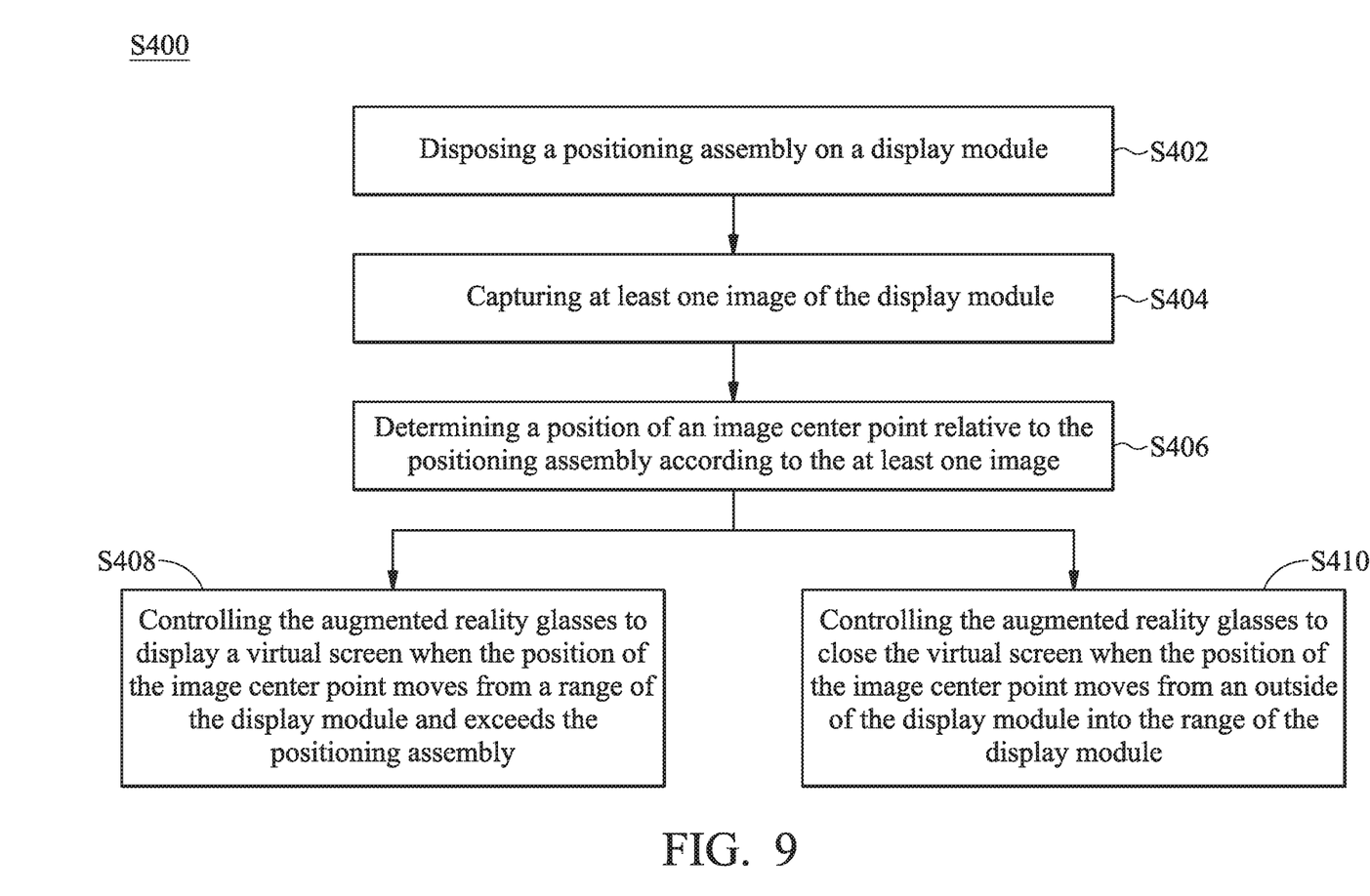
FIG. 9 is a flowchart of a method S400 of displaying a virtual screen using the augmented reality glasses 200 according to an embodiment of the present disclosure.

Next, please refer to FIG. 9, which is a flowchart of a method S400 of displaying a virtual screen using the augmented reality glasses 200 according to an embodiment of the present disclosure. In step S402, the positioning assembly 150 is disposed on the display module 102. The positioning assembly 150 can be implemented by the positioning elements 151 to 153 in FIG. 2 or the positioning elements 154 to 157 in FIG. 8, but it is not limited thereto. In step S404, at least one image of the display module 102 is captured by the image capturing module 204.

In step S406, the processing circuit 200C determines a position of an image center point (the center point CV) relative to the positioning assembly 150 according to the at least one image. In step S408, when the position of the image center point moves from the range of the display module 102 across the positioning assembly 150, the augmented reality glasses 200 are controlled to display a virtual screen, and this virtual screen extends from a side of the display module 102 (for example, from the first side edge 1021).

In addition, in step S410, when the position of the image center point (the center point CV) moves from the outside of the display module 102 into the range of the display module 102, the augmented reality glasses 200 are controlled to close the virtual screen.

The present disclosure provides an augmented reality system 50, which includes a portable electronic device 100, augmented reality glasses 200, and an expansion device 300. The user can wear the augmented reality glasses 200 and use the portable electronic device 100 at the same time. A positioning assembly 150 is disposed on the portable electronic device 100, and the processing circuit 200C can determine the position of the center point CV of the user's field of view FOV relative to the positioning assembly 150 according to the image provided by the image capturing module 204 on the augmented reality glasses 200 and further controls the optical display module 205 to display the corresponding virtual screen.

Therefore, based on the design of the present disclosure, the user does not need to purchase an extra physical screen to install on the portable electronic device 100, so that the mobility of the portable electronic device 100 can be maintained, and the purpose of adding an expanding screen can be achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An augmented reality system, comprising:
 a portable electronic device, having a display module and a positioning assembly, wherein the positioning assembly is disposed on the display module;
 augmented reality glasses, including an image capture module which is configured to capture at least one image of the display module; and
 a processing circuit, configured to determine a position of an image center point of the at least one image relative to the positioning assembly according to the at least one image;
 wherein when the processing circuit determines that the position of the image center point moves from the display module across the positioning assembly, the processing circuit controls the augmented reality glasses to display a virtual screen, wherein the virtual screen extends from a first side of the display module;
 wherein the display module has the first side, a second side, and a third side;
 wherein the augmented reality glasses and the at least one image defines a transverse axis, the virtual screen extends along the transverse axis, and an acute angle is formed between the virtual screen and the first side in response to a user's head with the augmented reality glasses tilting;

wherein the transverse axis is not parallel to the second side.

2. The augmented reality system as claimed in claim 1, wherein the positioning assembly includes three positioning elements each having a strip structure, the positioning elements are respectively disposed on the first side, the second side, and the third side, and the positioning elements have different colors.

3. The augmented reality system as claimed in claim 2, wherein the first side and the third side are arranged along a longitudinal axis, the virtual screen extends along the longitudinal axis, the virtual screen has a first length in the longitudinal axis, the display module has a second length in the longitudinal axis, and the first length is less than or equal to one-half of the second length.

4. The augmented reality system as claimed in claim 1, wherein the positioning assembly includes four positioning elements which are respectively disposed at four corners of the display module.

5. The augmented reality system as claimed in claim 4, wherein the four positioning elements are pixels displayed on a physical screen of the display module and located at four corners of the physical screen of the display module.

6. The augmented reality system as claimed in claim 4, wherein one of the positioning elements has a mark, shape or color that is different from the other three positioning elements.

7. The augmented reality system as claimed in claim 1, wherein the processing circuit is further configured to recognize a gesture according to the at least one image, and the processing circuit controls the augmented reality glasses to display the virtual screen according to the gesture.

8. The augmented reality system as claimed in claim 1, wherein when the processing circuit determines that the position of the image center point moves from the outside of the display module to the inside of the display module, the processing circuit controls the augmented reality glasses to close the virtual screen.

9. The augmented reality system as claimed in claim 1, wherein the augmented reality glasses further include an optical display module which is electrically connected to the processing circuit, and the optical display module includes:
 an optical guiding element; and
 an optical projector, configured to send a projection image to the optical guiding element according to a projection signal provided by the processing circuit.

10. The augmented reality system as claimed in claim 1, wherein the augmented reality system further comprises an expansion device, and the augmented reality glasses are electrically connected to the portable electronic device through the expansion device.

11. A method of displaying a virtual screen using augmented reality glasses, comprising:
 disposing a positioning assembly on a display module;
 capturing at least one image of the display module;
 determining a position of an image center point of the at least one image relative to the positioning assembly according to the at least one image; and
 controlling the augmented reality glasses to display a virtual screen when the position of the image center point moves from a range of the display module and exceeds the positioning assembly, wherein the virtual screen extends from a side of the display module;
 wherein the display module has a first side, a second side, and a third side;
 wherein the augmented reality glasses and the at least one image defines a transverse axis, the virtual screen extends along the transverse axis, and an acute angle is formed between the virtual screen and the first side in response to a user's head with the augmented reality glasses tilting;
 wherein the transverse axis is not parallel to the second side.

12. The method of displaying the virtual screen using augmented reality glasses as claimed in claim 11, further comprising:
 controlling the augmented reality glasses to close the virtual screen when the position of the image center point moves from an outside of the display module into the range of the display module.

13. The method of displaying the virtual screen using augmented reality glasses as claimed in claim 11, wherein the positioning assembly includes three positioning elements each having a strip structure, the positioning elements are respectively disposed on the first side, the second side, and the third side, and the positioning elements have different colors.

14. The method of displaying the virtual screen using augmented reality glasses as claimed in claim 13, wherein the first side and the third side are arranged along a longitudinal axis, the virtual screen extends along the longitudinal axis, the virtual screen has a first length in the longitudinal axis, the display module has a second length in the longitudinal axis, and the first length is less than or equal to one-half of the second length.

15. The method of displaying the virtual screen using augmented reality glasses as claimed in claim 11, wherein the positioning assembly includes four positioning elements which are respectively disposed at four corners of the display module.

16. The method of displaying the virtual screen using augmented reality glasses as claimed in claim 15, wherein the four positioning elements are pixels displayed on a physical screen of the display module and located at four corners of the physical screen of the display module.

17. The method of displaying the virtual screen using augmented reality glasses as claimed in claim 15, wherein one of the positioning elements has a mark, shape or color that is different from the other three positioning elements.

18. The method of displaying the virtual screen using augmented reality glasses as claimed in claim 11, wherein the augmented reality glasses include an optical display module which is electrically connected to a processing circuit, and the optical display module includes:
 an optical guiding element; and
 an optical projector, configured to send a projection image to the optical guiding element according to a projection signal provided by the processing circuit.

* * * * *